United States Patent
Dankbaar et al.

(10) Patent No.: US 11,078,008 B2
(45) Date of Patent: Aug. 3, 2021

(54) COLD CHAIN PACKAGING

(71) Applicant: Smurfit Kappa North America LLC, Irving, TX (US)

(72) Inventors: Jeroen Joop Dankbaar, Dallas, TX (US); Renuka Deshpande, Rowland Heights, CA (US); Gregory Vorce Hall, Dallas, TX (US); Rafael Gonzalez Rosas, San Ysidro, CA (US)

(73) Assignee: Smurfit Kappa North America LLC, Irving, TX (US)

( * ) Notice: Subject to any disclaimer, the term of this patent is extended or adjusted under 35 U.S.C. 154(b) by 0 days.

(21) Appl. No.: 16/287,068

(22) Filed: Feb. 27, 2019

(65) Prior Publication Data

US 2019/0329962 A1 Oct. 31, 2019

Related U.S. Application Data

(60) Provisional application No. 62/636,602, filed on Feb. 28, 2018.

(51) Int. Cl.
*B65D 81/38* (2006.01)
*B65D 5/56* (2006.01)

(52) U.S. Cl.
CPC .......... *B65D 81/3858* (2013.01); *B65D 5/56* (2013.01)

(58) Field of Classification Search
CPC .. B65D 81/3858; B65D 5/56; B65D 81/3823; B65D 65/466; B65D 81/3897; B65D 2590/043
USPC ..... 229/103.11, 122.32, 164.1; 220/592.1, 8, 220/9.4; 428/76, 152, 317.9, 36.91; 206/439, 484, 524.3, 594; 383/111; 53/427
See application file for complete search history.

(56) References Cited

U.S. PATENT DOCUMENTS

| 2,148,454 | A |   | 2/1939  | Gerard  |              |
|-----------|---|---|---------|---------|--------------|
| 5,208,267 | A | * | 5/1993  | Neumann | B65D 65/466  |
|           |   |   |         |         | 106/122      |
| 5,564,570 | A | * | 10/1996 | Jaszai  | B65D 81/1075 |
|           |   |   |         |         | 206/213.1    |

(Continued)

OTHER PUBLICATIONS

PCT Notification Concerning Payment of Prescribed Fees and Notification of the International Application Number and of the International Filing Date re PCT/US2019/019928, dated Mar. 8, 2019.

(Continued)

*Primary Examiner* — Christopher R Demeree
(74) *Attorney, Agent, or Firm* — Baker Botts L.L.P.

(57) ABSTRACT

An insulating insert for a packaging system includes six pockets and multiple sealed dividers. The six pockets are rectangular in shape and are each filled with an insulating material. The six pockets include a bottom pocket configured to contact a bottom inside surface of a box, four side pockets each configured to contact a respective side inside surface of the box, and a top pocket configured to contact a top inside surface of the box when the insulating insert is placed into the box. Each sealed divider is located between two adjacent pockets. The sealed dividers provide fold locations to permit the insulating insert to be folded and installed within the box so that each of the six pockets contacts a respective inside surface of the box.

10 Claims, 11 Drawing Sheets

(56) References Cited

U.S. PATENT DOCUMENTS

| | | | | |
|---|---|---|---|---|
| 5,897,017 | A * | 4/1999 | Lantz | B65D 81/3823 |
| | | | | 220/592.1 |
| 6,619,500 | B1 * | 9/2003 | Lantz | B65D 81/3823 |
| | | | | 220/592.1 |
| 6,938,968 | B2 * | 9/2005 | Tanimoto | B65D 81/18 |
| | | | | 312/406 |
| 8,617,684 | B2 * | 12/2013 | Nomura | B65D 81/3823 |
| | | | | 428/69 |
| 8,763,811 | B2 * | 7/2014 | Lantz | B65D 25/16 |
| | | | | 206/584 |
| 9,550,618 | B1 | 1/2017 | Jobe | |
| 9,751,683 | B1 * | 9/2017 | Jobe | B65D 81/3862 |
| 9,957,098 | B2 * | 5/2018 | Jobe | B65D 81/3848 |
| 9,981,797 | B2 * | 5/2018 | Aksan | B65D 81/3862 |
| 10,266,332 | B2 * | 4/2019 | Aksan | B65D 81/3862 |
| 10,288,337 | B2 * | 5/2019 | Blezard | B65D 21/0202 |
| 10,357,936 | B1 * | 7/2019 | Vincent | B32B 27/06 |
| 10,442,600 | B2 * | 10/2019 | Waitermire | B65D 33/02 |
| 10,507,968 | B2 * | 12/2019 | Sollie | B65D 5/3678 |
| 10,551,110 | B2 * | 2/2020 | Waltermire | F25D 23/069 |
| 10,745,187 | B1 * | 8/2020 | Vincent | B65D 81/3858 |
| 2007/0051787 | A1 | 3/2007 | Schille et al. | |
| 2008/0289302 | A1 | 11/2008 | Vulpitta | |
| 2010/0314397 | A1 * | 12/2010 | Williams | B65D 81/3823 |
| | | | | 220/592.01 |
| 2018/0229917 | A1 * | 8/2018 | Jobe | B32B 29/08 |
| 2018/0299059 | A1 * | 10/2018 | McGoff | F16L 59/00 |

OTHER PUBLICATIONS

PCT Notification of Transmittal of the International Search Report and the Written Opinion of the International Searching Authority, or the Declaration re PCT/US2019/019928, dated May 9, 2019.

* cited by examiner

COLD CHAIN PACKAGING

PRIORITY

This application claims the benefit, under 35 U.S.C. § 119(e), of U.S. Provisional Patent Application No. 62/636,602, filed 28 Feb. 2018 and titled "Cold Chain Packaging," which is incorporated herein by reference in its entirety.

TECHNICAL FIELD

This disclosure generally relates to packaging and more specifically to cold chain packaging.

BACKGROUND

Many businesses ship items to customers via various freight or parcel services. Some items, however, need to remain below a certain temperature at all times to avoid spoilage. For example, fresh cut flowers should remain below a certain temperature to avoid wilting. As another example, certain pharmaceuticals must remain below a certain temperature to remain usable. While certain packaging solutions are currently available for shipping items that must remain cold, they are typically expensive, are not easy to use, and are not environmentally friendly.

SUMMARY OF PARTICULAR EMBODIMENTS

According to one embodiment, a packaging system for shipping cold items includes a box and two C-wraps. The box includes a moisture barrier coating on a plurality of inside surfaces of the box. Each C-wrap includes three pockets filled with an insulating material and two sealed dividers. Each of the three pockets includes a rectangular shape. The three pockets include two end pockets and a center pocket between the two end pockets. The dimensions of each of the three pockets correspond to dimensions of one inside surface of the box. Each C-wrap is formed from two sheets of paper that are each coated with a heat-seal coating. Each sealed divider is located between the center pocket and one of the end pockets. The sealed dividers provide fold locations to permit each C-wrap to be installed within the box so that each pocket of each C-wrap contacts a respective inside surface of the box.

According to another embodiment, an insulating insert for a packaging system includes six pockets and multiple sealed dividers. The six pockets are rectangular in shape and are each filled with an insulating material. The six pockets include a bottom pocket configured to contact a bottom inside surface of a box, four side pockets each configured to contact a respective side inside surface of the box, and a top pocket configured to contact a top inside surface of the box when the insulating insert is placed into the box. Each sealed divider is located between two adjacent pockets. The sealed dividers provide fold locations to permit the insulating insert to be folded and installed within the box so that each of the six pockets contacts a respective inside surface of the box.

Technical advantages of certain embodiments may include providing a cold chain shipping system that is inexpensive, quick to assemble, easy to use, and is recyclable. Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Many businesses ship items to customers via various freight or parcel services. Some items, however, need to remain below a certain temperature at all times to avoid spoilage. For example, fresh cut flowers should remain below a certain temperature to avoid wilting. As another example, certain pharmaceuticals must remain below a certain temperature to remain usable. While certain packaging solutions are currently available for shipping items that must remain cold, they are typically expensive, are not easy to use, and are not environmentally friendly.

The teachings of the disclosure recognize that it is desirable to provide a cold-chain shipping system that is inexpensive, easy to use, and is completely recyclable. The following describes shipping systems that utilize unique C-wraps and insulating inserts in order to provide these and other advantages.

Figure 1:
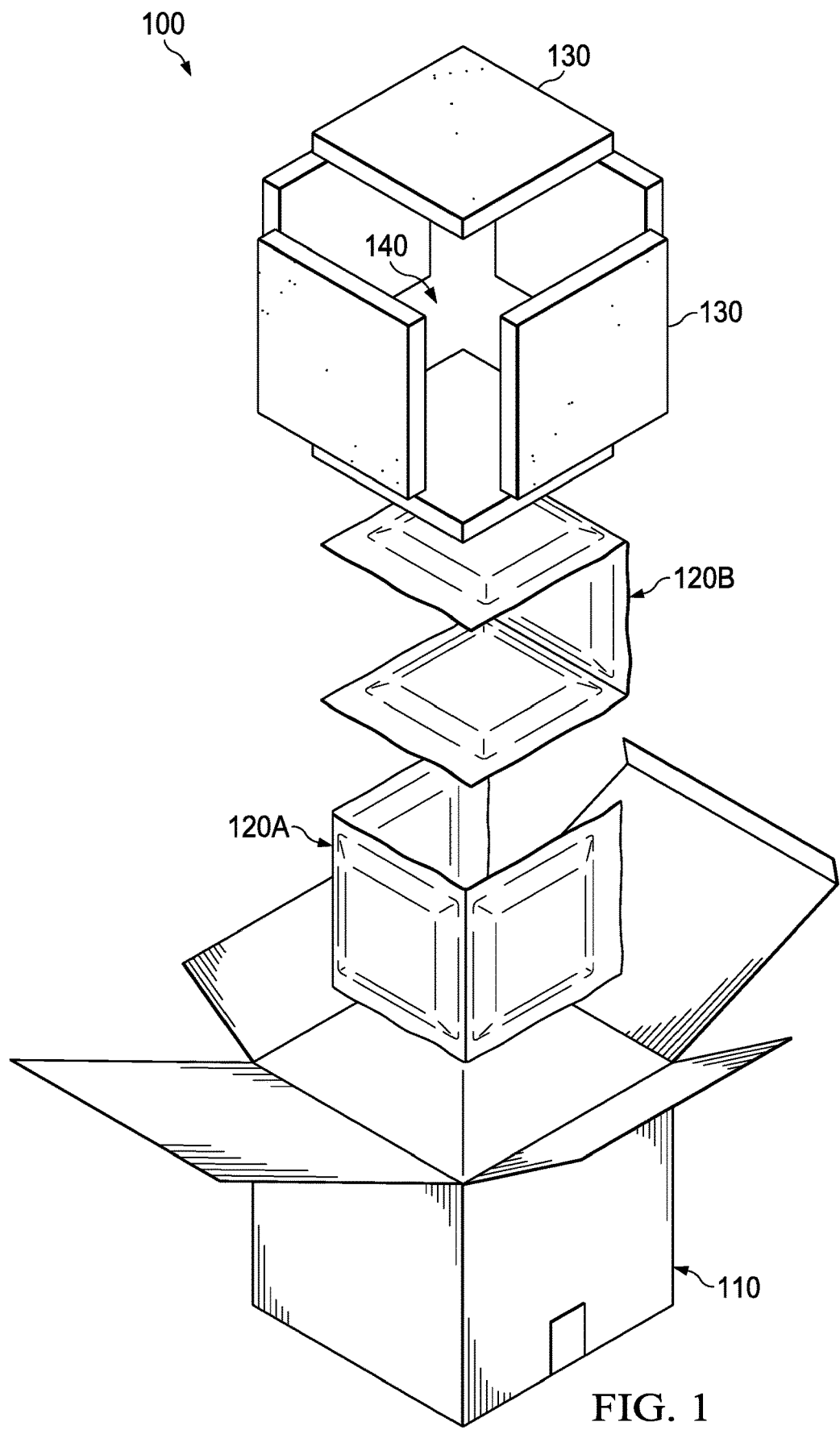
FIG. 1 illustrates a cold-chain packaging system, according to certain embodiments.
Figure 2A:
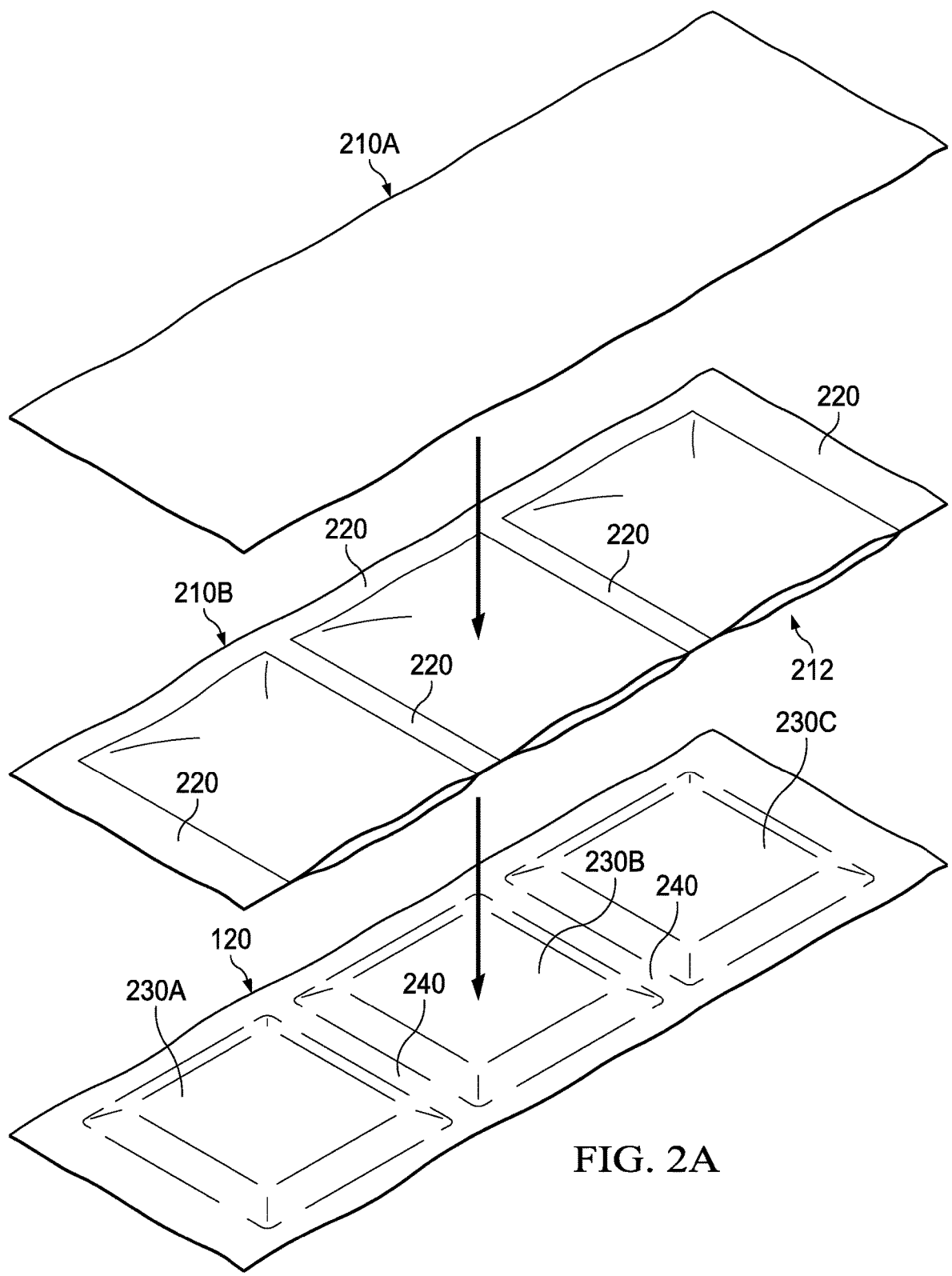
FIG. 2A illustrates a C-wrap that may be used in the cold-chain packaging system of FIG. 1, according to certain embodiments.
Figure 2B:
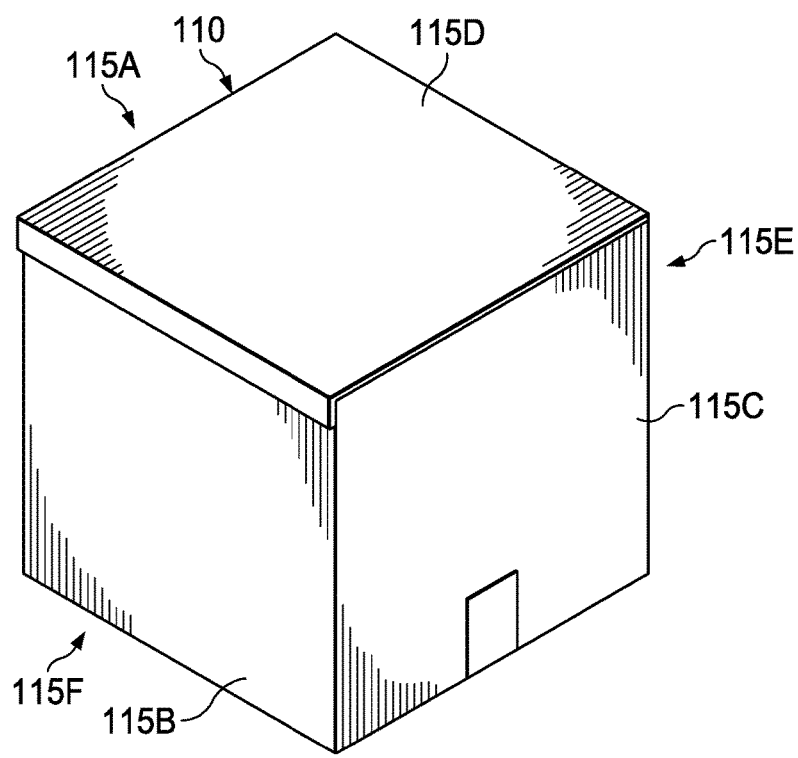
FIG. 2B illustrates a box of the cold-chain packaging system of FIG. 1, according to certain embodiments.
Figure 6:
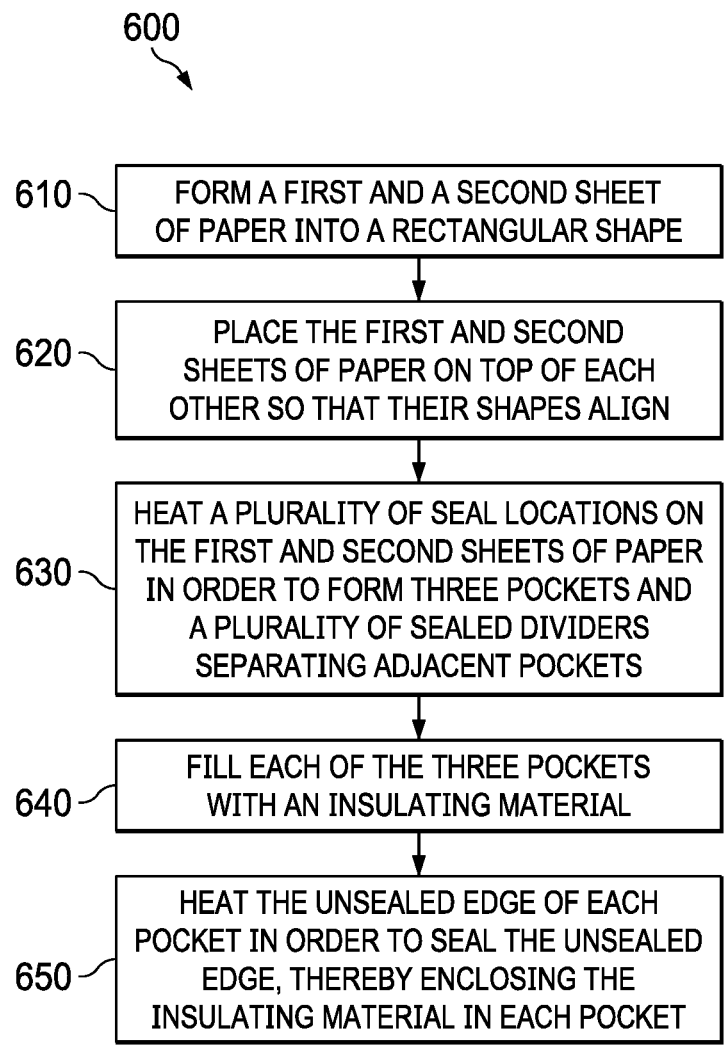
FIG. 6 illustrates a method of manufacturing the C-wrap of FIG. 2A, according to certain embodiments.
Figure 7:
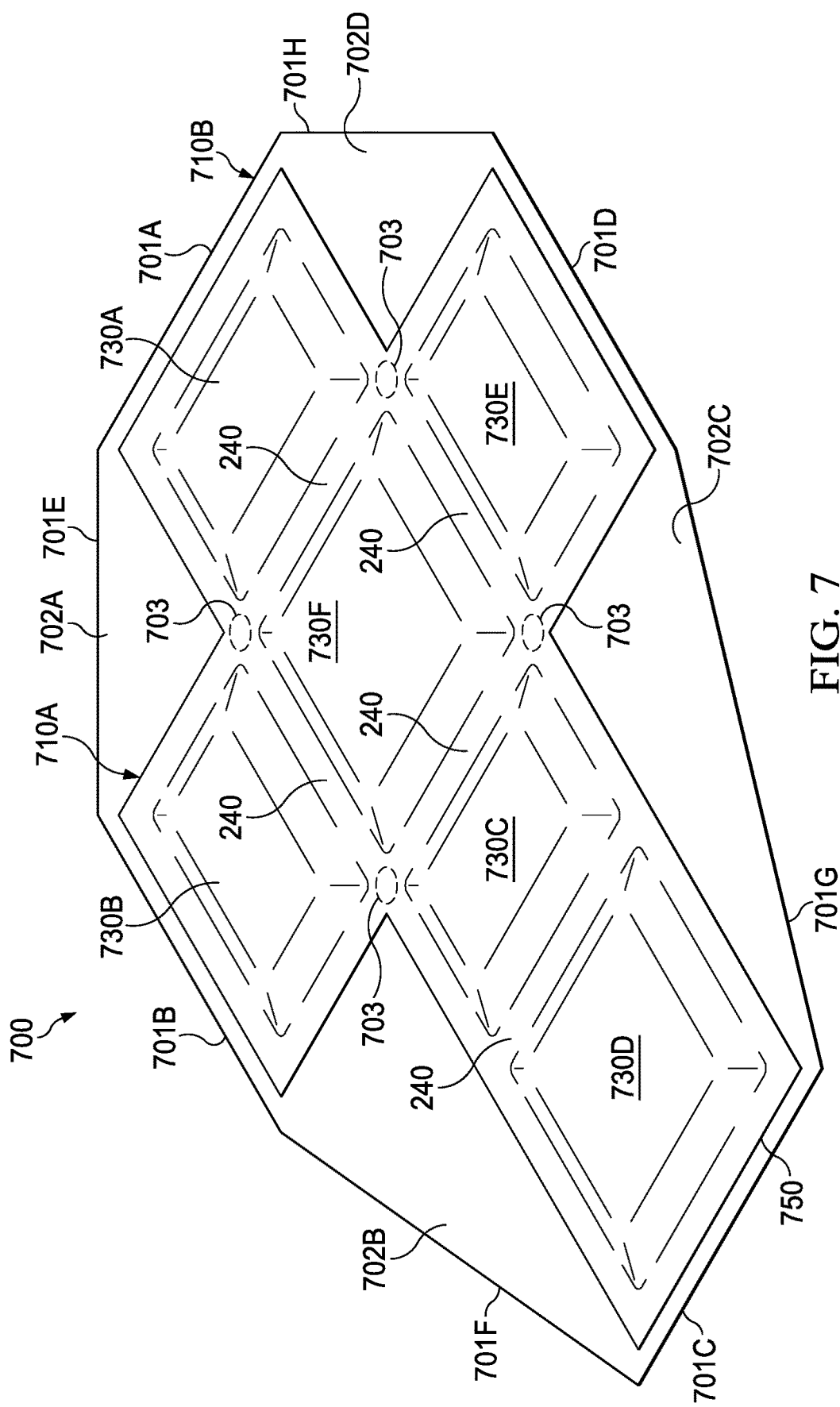
FIG. 7 illustrates another insulating insert for the cold-chain packaging system of FIG. 1, according to certain embodiments.
Figure 8:
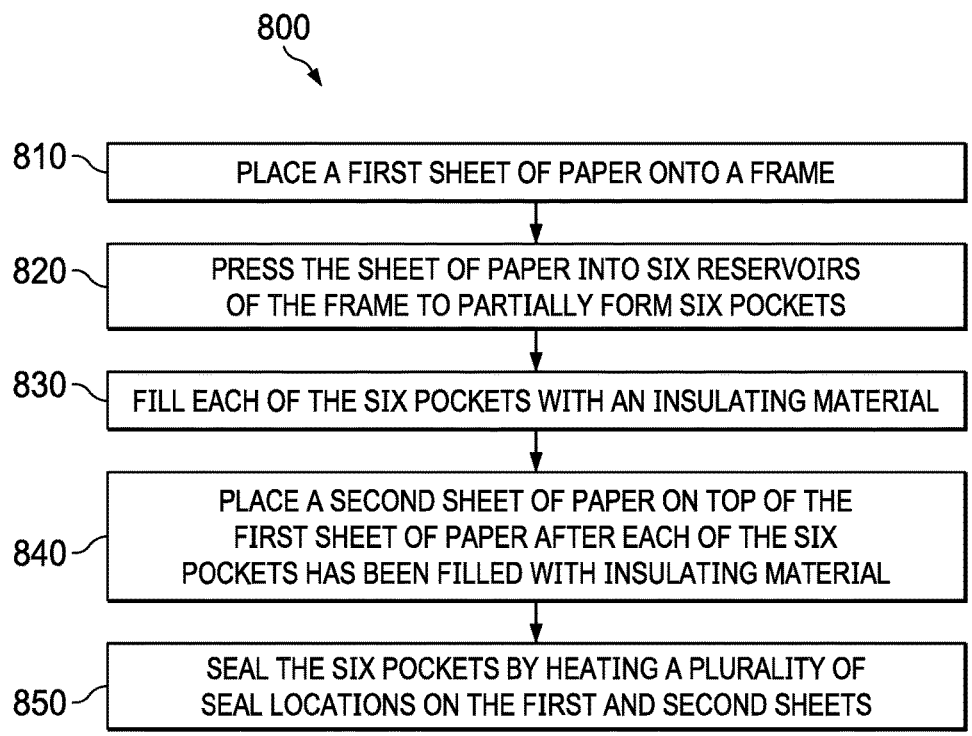
FIGS. 8-16 illustrate a method of manufacturing the insulating insert of FIG. 7, according to certain embodiments.

FIG. 1 illustrates a cold-chain packaging system; FIG. 2A illustrates a C-wrap that may be used in the cold-chain packaging system of FIG. 1, FIG. 2B illustrates a box of the cold-chain packaging system of FIG. 1, FIGS. 3-5 illustrate an insulating insert for the cold-chain packaging system of FIG. 1 that may be formed from two C-wraps of FIG. 2A; FIG. 6 illustrates a method of manufacturing the C-wrap of FIG. 2A; FIG. 7 illustrates another insulating insert for the cold-chain packaging system of FIG. 1, and FIGS. 8-16 illustrate a method of manufacturing the insulating insert of FIG. 7, according to certain embodiments.

FIG. 1 illustrates a cold-chain packaging system 100, according to certain embodiments. Packaging system 100 may include a box 110, two C-wraps 120, and six gel packs 130. Each C-wrap 120 includes three sections and may be folded so that each section contacts one of the inside surfaces of box 110 (i.e., the top, bottom, and four sides) as illustrated. Optionally, the six gel packs 130 (or any other appropriate number of gel packs 130) may be inserted into the middle of the two C-wraps 120 so that each one contacts one of the sections of the C-wraps 120. The space inside the gel packs 130 may be a payload space 140 in which a shipping item that is to remain cold may be placed. While gel packs 130 have been described and illustrated in FIG. 1, any other appropriate cooling elements (e.g. gel packs, dry ice, and the like) may be used.

Box 110 is any appropriate shipper box. In some embodiments, box 110 is made of recyclable cardboard. In some embodiments, the inside surfaces of box 110 are coated with a moisture barrier.

In general, packaging system 100 provides a low-cost, recyclable solution for shipping items that must remain cold. To use packaging system 100, a user may first place a first C-wrap 120A into box 110 as illustrated. This will result in each section of C-wrap 120A contacting a respective inside surface of box 110 (e.g., three adjacent sides of box 110). Next, a user may place a second C-wrap 120B into box 110 as illustrated. This will result in each section of C-wrap 120B contacting a respective inside surface of box 110 (e.g., one side and the bottom and top of box 110 once box 110 is closed and sealed). Gel packs 130 (e.g., up to six gel packs 130) and the payload item to be shipped may then be placed in the space within the two C-wraps 120. Box 110 may then be sealed and shipped.

FIG. 2A illustrates a C-wrap 120 that may be used in the cold-chain packaging system 100 of FIG. 1, according to certain embodiments. C-wrap 120 may be made of two sheets of paper 210 (i.e., 210A and 210B) that are each in the shape of a rectangle. Each sheet of paper 210 may also be coated on one or both sides with a heat-seal coating. Sheets of paper 210 may be placed on top of each other and heat may be applied along seal locations 220 (i.e., along three sides of sheets of paper 210 and along sealed dividers 240). This may cause the heat-seal coating to melt and bond the sheets of paper 210 together at seal locations 220. An insulating material such as Green Fiber (or any other recyclable material) may then be inserted into the pockets 230 of C-wrap 120. Once each pocket 230 is filled with the insulating material, heat may be applied to the unsealed front edge 212 of C-wrap 120 in order to enclose the insulating material in pockets 230.

In general, pockets 230 of C-wrap 120 are sized according to box 110. For example, the length and width of each pockets 230 may correspond to a particular side 115 of box 110. For example, the dimensions of pocket 230A of C-wrap 120A may correspond to side 115A of box 110, the dimensions of pocket 230B of C-wrap 120A may correspond to side 115B of box 110, and the dimensions of pocket 230C of C-wrap 120A may correspond to side 115C of box 110. Similarly, the dimensions of pocket 230A of C-wrap 120B may correspond to top side 115D of box 110, the dimensions of pocket 230B of C-wrap 120B may correspond to side 115E of box 110, and the dimensions of pocket 230C of C-wrap 120B may correspond to bottom side 115F of box 110. In some embodiments, all pockets 230 have the same dimensions. In other embodiments, pockets 230 have different dimensions.

Sealed dividers 240, which are the dividers between center pocket 230B and the two outer pockets 230 (i.e., pockets 230A and 230C) provide a unique and convenient feature for packaging system 100. Sealed dividers 240 provide for convenient fold locations in which to fold C-wrap 120 before placing it into box 110. A user may simply fold each C-wrap 120 along each sealed divider 240 and place it into box 110 as illustrated in FIG. 1. This eliminates the guess work out of trying to place C-wrap 120 into box 110, thereby saving time and reducing frustration. Furthermore, sealed dividers 240 permit C-wrap 120 to be thinner than they would be without sealed dividers 240. For example, if a sheet of insulating material was used within C-wrap 120 that ran from one end of C-wrap 120 to the opposite end (i.e., without sealed dividers 240), C-wrap 120 would bunch up when folded and placed into box 110, thereby reducing payload space 140.

Figure 3:
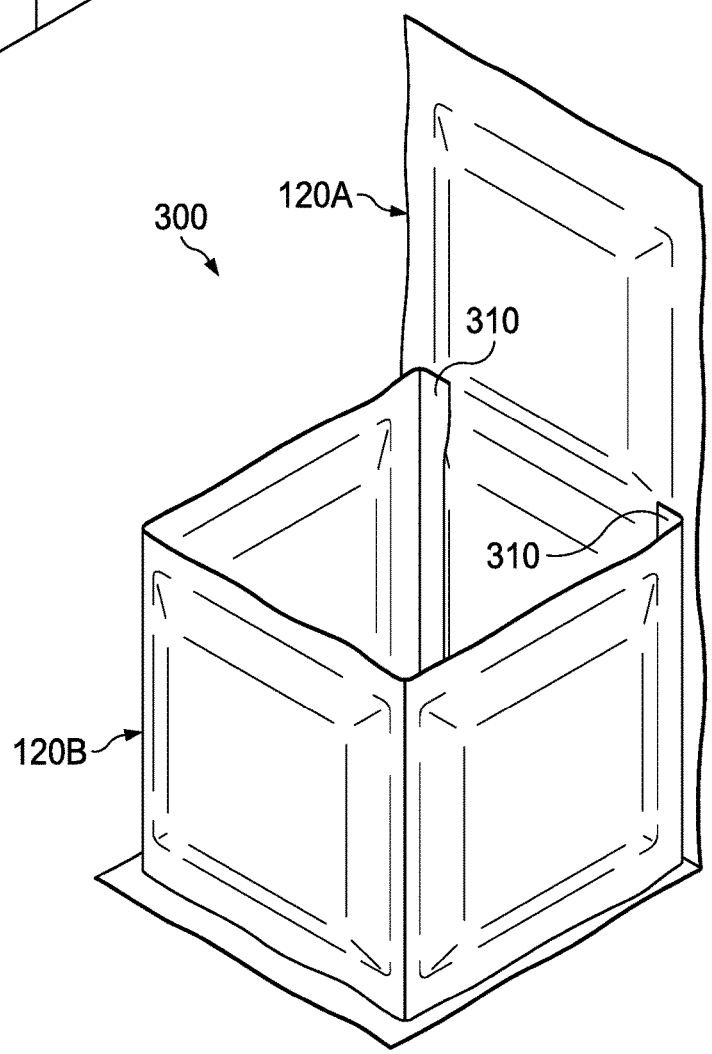
FIGS. 3-5 illustrate an insulating insert for the cold-chain packaging system of FIG. 1 that may be formed from two C-wraps of FIG. 2A, according to certain embodiments.
Figure 4:
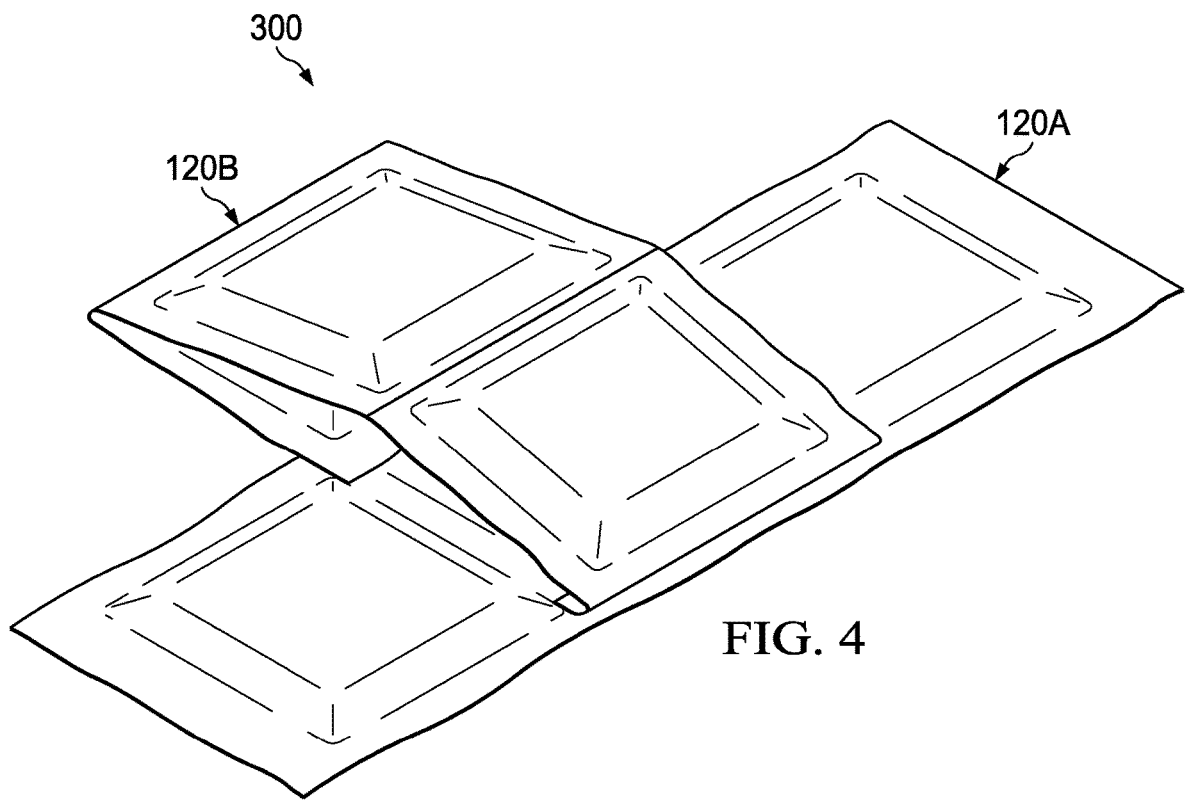
Figure 5:
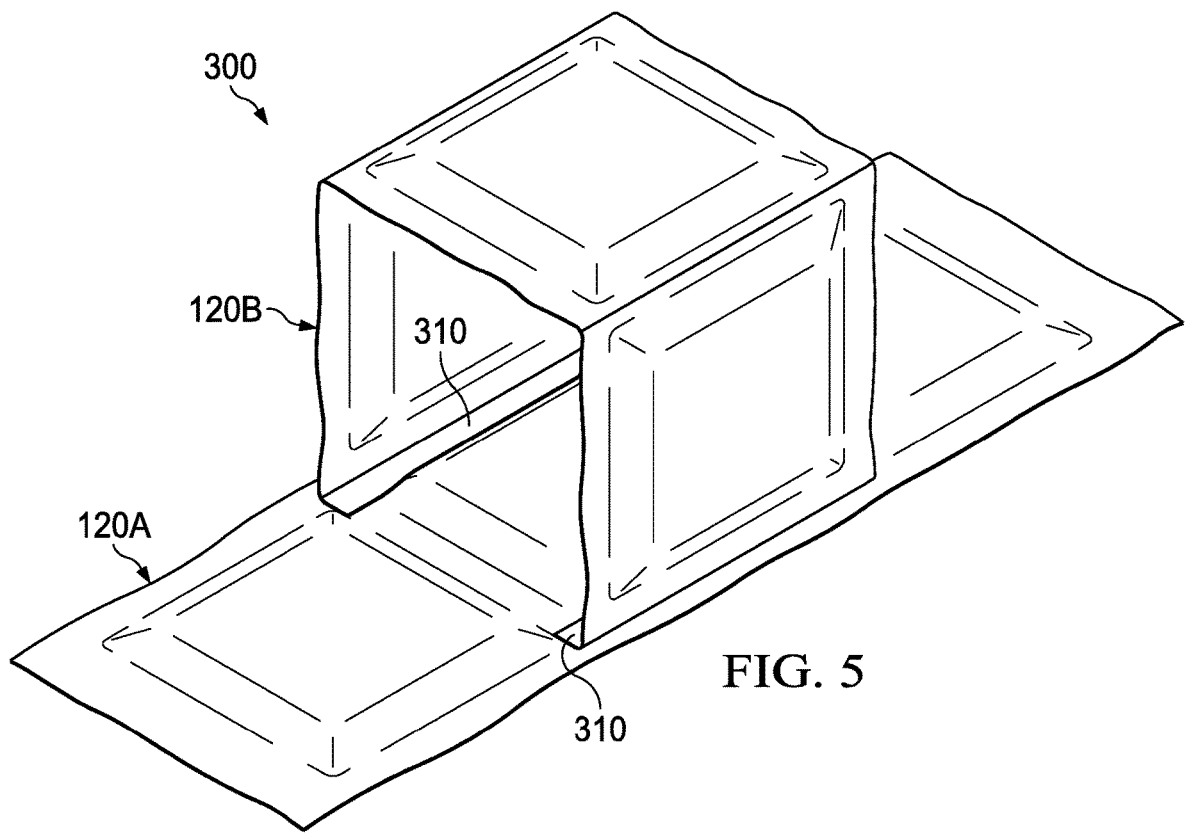

FIGS. 3-5 illustrate an insulating insert 300 for the cold-chain packaging system 100 of FIG. 1 that may be formed from two C-wraps 120 of FIG. 2A, according to certain embodiments. In this embodiment, C-wrap 120B is coupled to C-wrap 120A at locations 310. More specifically, two opposite ends of C-wrap 120B, which may be referred to as "flaps," may be glued or otherwise coupled to center pocket 230B as illustrated (i.e., on the two edges of center pocket 230B that are perpendicular to sealed dividers 240). This may permit a user to reduce the assembly time of packaging system 100. Furthermore, insulating insert 300 may be able to lie flat (i.e., in a single plane) as illustrated in FIG. 4. This may reduce the cost to ship insulating insert 300 to end users and retailers.

FIG. 6 illustrates a method 600 of manufacturing C-wrap 120 of FIG. 2A, according to certain embodiments. Method 600 may begin in step 610 where first and second sheets of paper are formed into a rectangular shape. In some embodiments, each sheet of paper includes a heat-seal coating on each surface of the sheet of paper.

At step 620, the first and second sheets of paper are placed on top of each other so that their shapes align. At step 630, seal locations on the first and second sheets of paper are heated in order to form three pockets and a plurality of sealed dividers separating adjacent pockets. The three pockets include two end pockets and a center pocket between the two end pockets. One edge of each pocket is left unsealed to allow for filling of each pocket.

At step 640, each of the three pockets formed in step 630 are filled with an insulating material. In some embodiments, the insulating material is Green Fiber or any other recyclable material. At step 650, which occurs after filling each of the three pockets with the insulating material in step 640, the unsealed edge of each pocket is heated in order to seal the unsealed edge, thereby enclosing the insulating material in each pocket.

In some embodiments, C-wraps 120 may be formed from other methods that do not involve heating the heat-seal coating of the paper in order to form the seals around the pockets of insulating material. Instead, an adhesive may be applied to one side of each sheet of paper (either over the entire side or only at seal locations 220) and the adhesive may form the seals around the edges of the C-wrap 120 and around pockets 230. In such embodiments, the insulating material may be held in place by the adhesive.

FIG. 7 illustrates another insulating insert 700 for cold-chain packaging system 100 of FIG. 1, according to certain embodiments. Insulating insert 700 is similar to insulating insert 300, but instead of being formed from two C-wraps 120, insulating insert 700 is form as a single unit. This may reduce manufacturing costs and provide for a simpler end-product for the user. An example process of forming insulating insert 700 is discussed in more detail below with reference to FIGS. 8-16.

Insulating insert 700, like C-wrap 120 above, may be formed from two sheets of paper 710 (i.e., a first sheet of paper 710A and a second sheet of paper 710B). Each sheet of paper 710 may be coated on one or both sides with a heat-seal coating. Sheets of paper 710 may be placed on top of each other (as described further below) and heat may be applied along seal locations 1310 (as described in reference to FIG. 13). This may cause the heat-seal coating to melt and bond the sheets of paper 710 together at seal locations 1310, thereby encasing the insulating material within pockets 730 and forming sealed dividers 240. The insulating material may be cellulose insulation (e.g., Green Fiber) or any other recyclable material.

In general, insulating insert 700 includes six pockets 730 that are each filled with an insulating material as described above. Pockets 730, in some embodiments, are rectangular in shape (e.g., square or rectangular). Pockets 730 include a top pocket 730D, a bottom pocket 730F, and four side pockets: 730A, 730B, 730C, and 730E. Bottom pocket 730F is configured to contact a bottom inside surface of box 110 when insulating insert 700 is folded and placed into box 110. The four side pockets (730A, 730B, 730C, and 730E) are each configured to contact a respective side inside surface of box 110 when insulating insert 700 is folded and placed into box 110. Top pocket 730D is configured to contact a top inside surface of box 110 when insulating insert 700 is folded and placed into box 110. Each of the four side pockets are adjacent to a respective side of bottom pocket 730D (e.g., side pocket 730B is adjacent to one of the four sides of bottom pocket 730D). Top pocket 730D is adjacent to a side of one of the four side pockets (e.g., side pocket 730C).

Pockets 730, like pockets 230 above, may be sized according to the dimensions of box 110. For example, the length and width of each pocket 730 may correspond to a particular side 115 of box 110. For example, the dimensions of pocket 730A may correspond to side 115A of box 110, the dimensions of pocket 730B may correspond to side 115B of box 110, the dimensions of pocket 730C may correspond to side 115C of box 110, the dimensions of pocket 730D may correspond to side 115D of box 110, the dimensions of pocket 730E may correspond to side 115E of box 110, and the dimensions of pocket 730F may correspond to side 115F of box 110. In some embodiments, all pockets 730 have the same dimensions. In other embodiments, pockets 730 have different dimensions.

After assembly as described further below, insulating insert 700 may in some embodiments be in a shape that has eight sides 701 and four triangular tabs 702, as illustrated in FIG. 7. The eight sides 701 may include a first set of four sides 710A-D that are each parallel with a respective side of one of the six pockets 730, in some embodiments. For example, side 710A is parallel with a side of pocket 730A, side 710B is parallel with a side of pocket 730B, side 710C is parallel with a side of pocket 730D, and side 710D is parallel with a side of pocket 730E, as illustrated in FIG. 7. The eight sides 701 may also include a second set of four sides 710E-H that each form one side of one of the triangular tabs 702. For example, side 701E forms one side of triangular tab 702A, side 701F forms one side of triangular tab 702B, side 701G forms one side of triangular tab 702C, and side 701H forms one side of triangular tab 702D, as illustrated in FIG. 7. In general, triangular tabs 702 may be folded when insulating insert 700 is placed into box 110 and function to provide additional support to insulating insert 700. In some embodiments, each triangular tab 702 includes a corner that is proximate to one of the corners of bottom pocket 730F at location 703. While a specific outline of insulating insert 700 is illustrated in FIG. 7, other embodiments may have any other appropriate shape and may have any other appropriate number of sides 701 and triangular tabs 702 (including zero triangular tabs 702).

Like C-wraps 120, insulating insert 700 includes sealed dividers 240. Sealed dividers 240 are the dividers between two adjacent pockets 730 and provide a unique and convenient feature for packaging system 100. Sealed dividers 240 provide for convenient fold locations in which to fold insulating insert 700 before placing it into box 110. A user may simply fold insulating insert 700 along each sealed divider 240 and place it into box 110. This eliminates the guess work out of trying to place insulating insert 700 into box 110, thereby saving time and reducing frustration. Furthermore, sealed dividers 240 enable insulating insert 700 to be thinner than it would be without sealed dividers 240, thereby increasing payload space 140.

In some embodiments, insulating insert 700 includes a flap 750 that is adjacent to top pocket 730D. In general, flap 750 provides a convenient way to seal the contents of payload space 140 within insulating insert 700. Once insulating insert 700 is folded and inserted into box 110, the payload may be inserted into payload space 140. Flap 750 may then be folded over and adhered to insulating insert 700 or box 110. In some embodiments, an adhesive (e.g., a peel-off adhesive strip) is included on tab 750 and/or on the opposite end of insulating insert 700 (i.e., proximate to pocket 730A) to enable tab 750 to adhere to insulating insert 700 or box 110.

Figure 9:
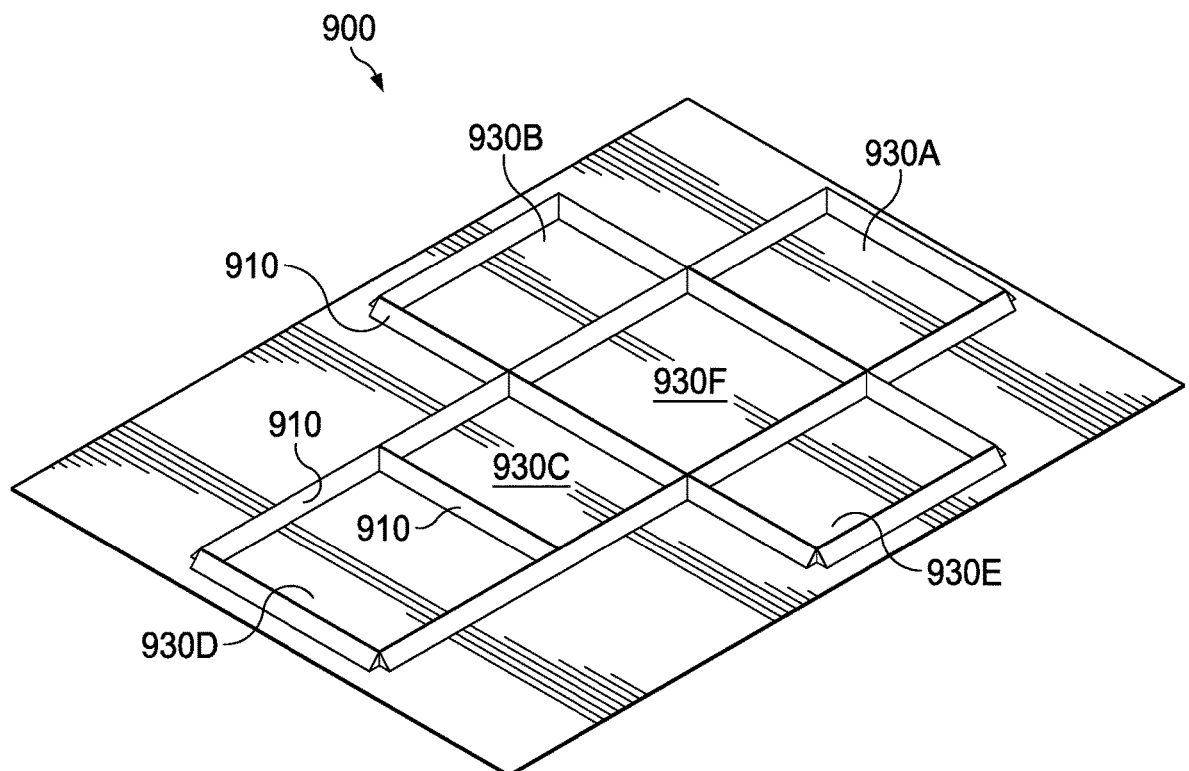

FIGS. 8-16 illustrate a method 800 of manufacturing insulating insert 700 of FIG. 7, according to certain embodiments. In some embodiments, method 800 begins at step 810 where a first sheet of paper is placed onto a frame. In some embodiments, the first sheet of paper is paper 710 and includes a heat-seal coating applied on a first side of the first sheet of paper. In some embodiments, the frame is a frame such as frame 900 as illustrated in FIG. 9. Frame 900 may include six reservoirs 930 (i.e., reservoirs 930A-F) that are each formed by a plurality of raised members 910. In some embodiments, the first sheet of paper is placed onto the frame with the first side (e.g., a side with the a heat-seal coating) facing away from the frame. In some embodiments, the first sheet of paper does not include a heat-seal coating. In such embodiments, the second sheet of paper as described below may include a heat-seal coating, or an alternative adhesive/bonding process may be used.

Figure 10:
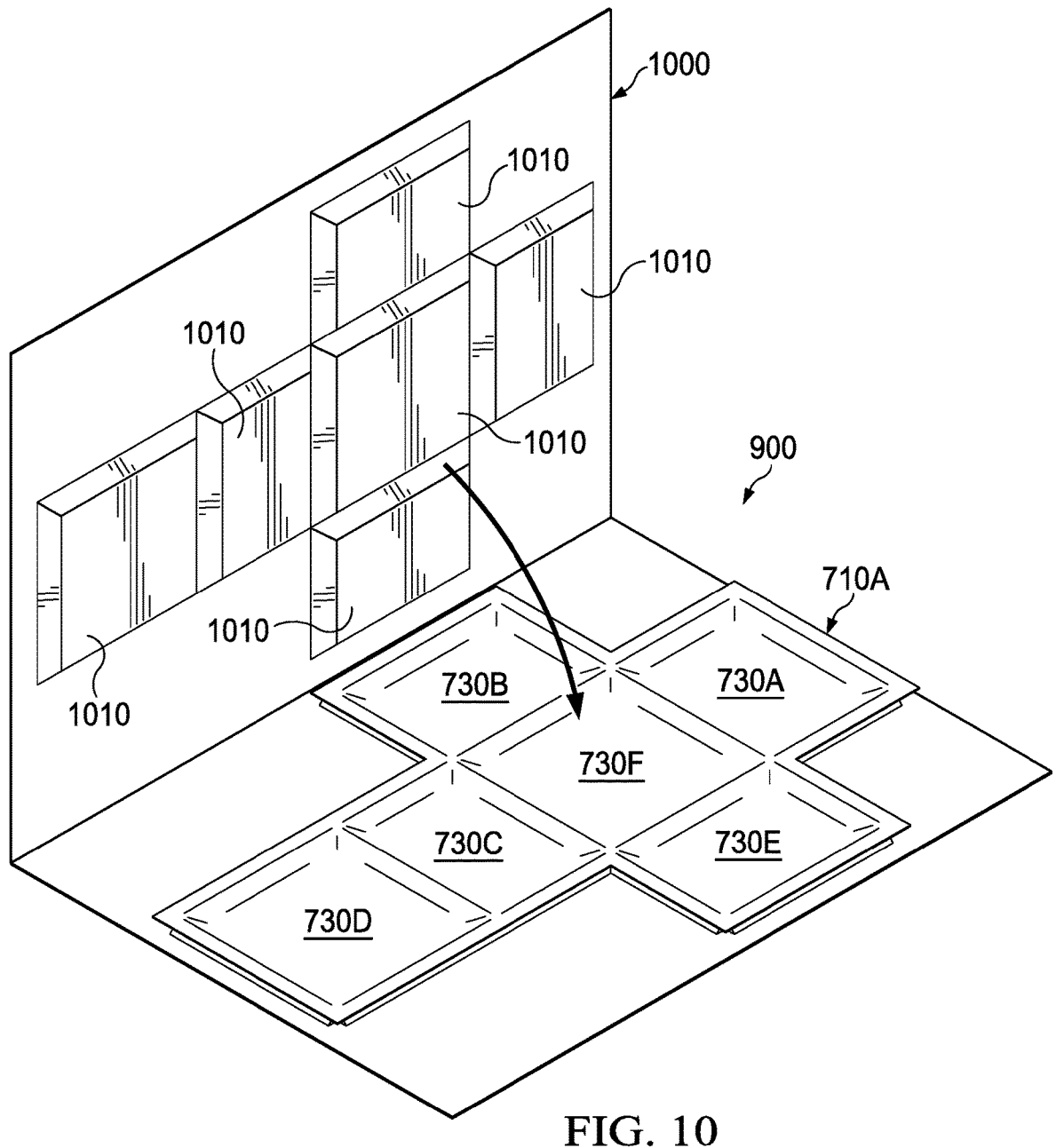
Figure 11:
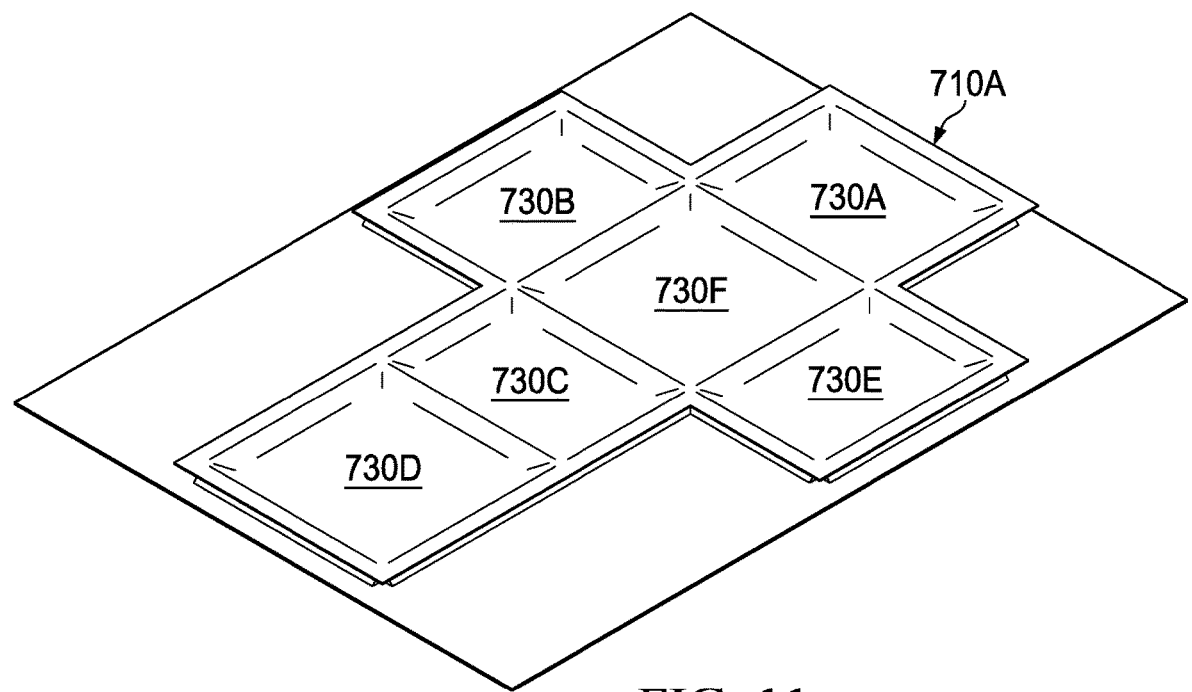

At step 820, the first sheet of paper 710A is pressed into the six reservoirs 930 of frame 900, thereby partially forming six pockets 730 in the first sheet of paper 710A. This step is illustrated in FIGS. 10-11. In some embodiments, pressing the first sheet of paper 710A into the six reservoirs 930 of frame 900 includes using a pressing tool 1000. In some embodiments, pressing tool 1000 includes six raised rectangular sections 1010 that each correspond in shape to the six reservoirs 930 of frame 900.

Figure 12:
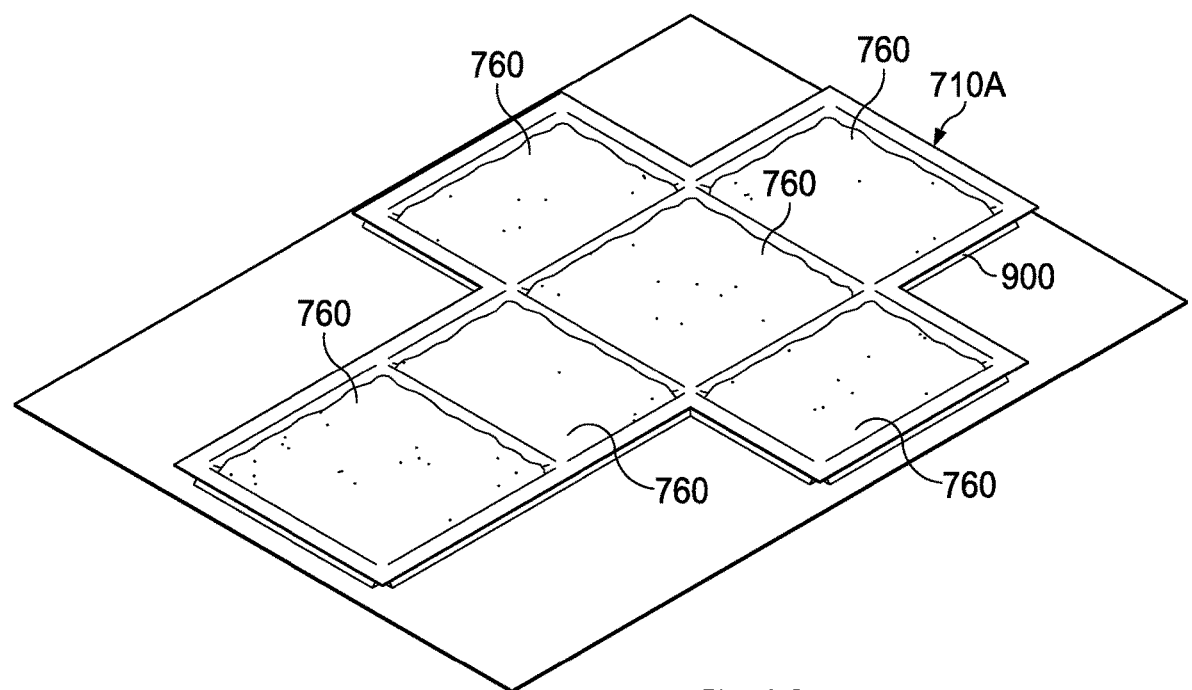

At step 830, each of the six pockets 730 are filled with an insulating material 760. This step is illustrated in FIG. 12. As described above, insulating material 760 may be cellulose insulation (e.g., Green Fiber) or any other recyclable material.

At step 840, a second sheet of paper 710B is placed on top of the first sheet of paper 710A after each of the six pockets 730 has been filled with the insulating material 760. In some embodiments, the second sheet of paper 710B includes a heat-seal coating applied on a second side of the second sheet of paper 710B such that when the second sheet of paper 710B is placed onto the first sheet of paper 710A, the heat-seal coating of the second side of the second sheet of paper 710B contacts the heat-seal coating of the first side of the first sheet of paper 710A.

Figure 13:
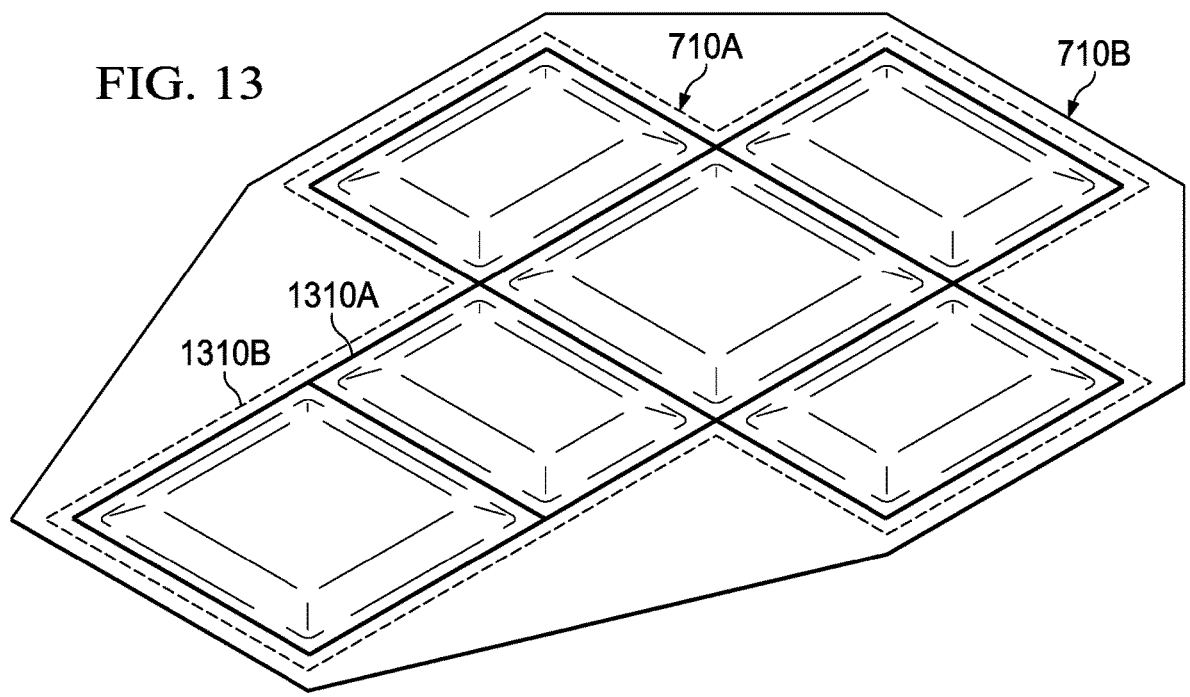
Figure 14:
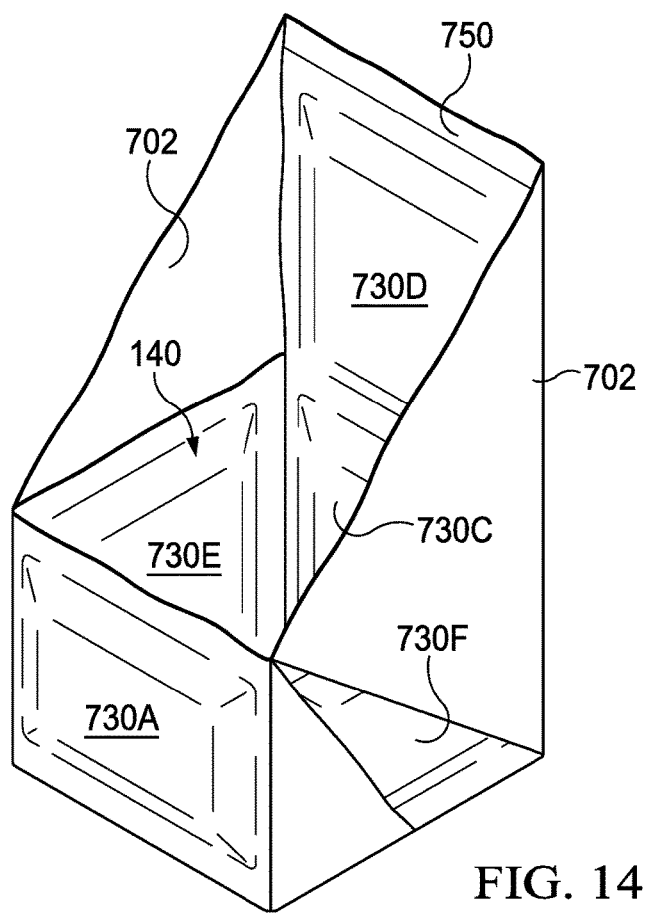
Figure 15:
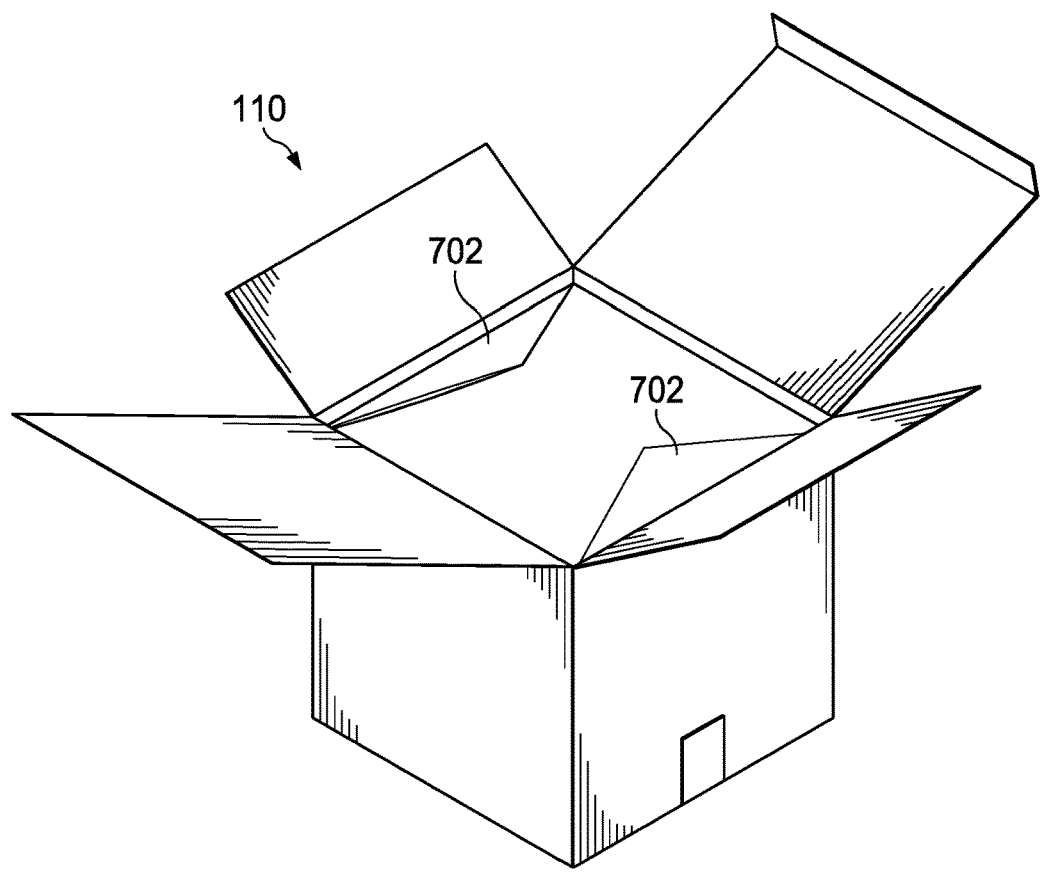
Figure 16:
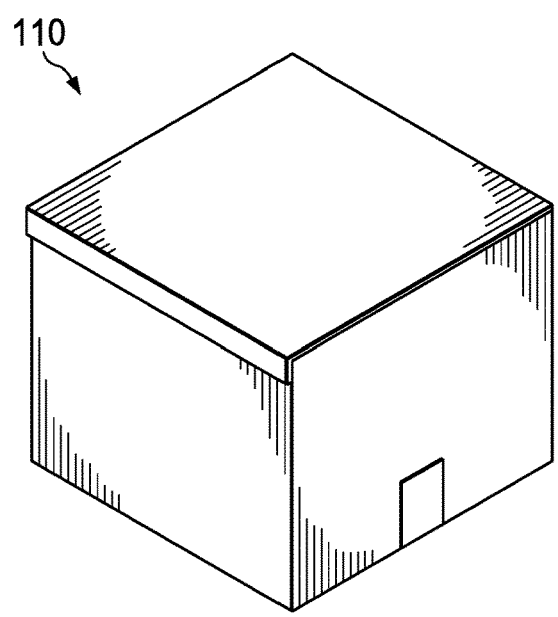

At step 850, a plurality of seal locations 1310 on the first and second sheets of paper 710 are heated in order to seal the insulating material within the six pockets 730 and in order to form a plurality of sealed dividers 240 separating adjacent pockets 730. This step is illustrated in FIG. 13. In some embodiments, seal locations 1310 include seal locations 1310A and 1310B. Seal locations 1310A, which are illustrated as a dark solid line around pockets 730, function to seal insulating material 760 within pockets 730. In some embodiments, seal locations 1310A are approximately 3/16 of an inch wide. Seal locations 1310B, which are illustrated as a dashed line around the perimeter of pockets 730, function to adhere the first sheet of paper 710A to the second sheet of paper 710B. In some embodiments, seal locations 1310B are approximately 1 inch wide. In some embodiments, seal locations 1310 correspond to raised members 910 of the six reservoirs 930 of frame 900. In some embodiments, heating the seal locations 1310 on the first and second sheets of paper 710 includes placing a metal plate (not illustrated) on top of the second sheet of paper 710B after the second sheet of paper 710B has been placed on top of the first sheet of paper 710B. The metal plate may then be heated using any appropriate method in order to heat seal locations 1310 along raised members 910. After step 850, insulating insert 700 may be folded along sealed dividers 240 (FIG. 14) and then placed into box 110 (FIG. 15). Payload space 140 of box 110 may then be filled, insulating insert 700 may be sealed (e.g., using flap 750), and box 110 may be sealed (FIG. 16).

In some embodiments, the first sheet of paper 710A has a first shape that corresponds to an outline of the six reservoirs 930 of frame 900 (e.g., generally following the dashed line of seal locations 1310B as illustrated in FIG. 13). In some embodiments, the second sheet of paper 710B has a second shape that includes eight sides and four triangular tabs, as described above with respect to insulating insert 700. In other embodiments, sheets of paper 710 may have any other appropriate shape (e.g., both sheets of paper 710 may be rectangular or both sheets of paper 710 may correspond to the outline of the six reservoirs 930 of frame 900).

In some embodiments, insulating insert 700 may be formed from other methods that do not involve heating the heat-seal coating of the paper in order to form the seals around the pockets of insulating material. Instead, an adhesive may be applied to one side of each sheet of paper (either over the entire side or only at seal locations 1310) and the adhesive may form the seals around the edges of insulating insert 700 and around pockets 730. In such embodiments, the insulating material may be held in place by the adhesive.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A packaging system for shipping one or more cold items, the packaging system comprising:
    a box comprising a moisture barrier coating on a plurality of inside surfaces of the box; and
    an insulating insert comprising:
        six pockets and a plurality of sealed dividers, the six pockets comprising:
            a bottom pocket configured to contact a bottom inside surface of the box when the insulating insert is placed into the box;
            four side pockets each configured to contact a respective side inside surface of the box when the insulating insert is placed into the box, each of the four side pockets adjacent to a respective side of the bottom pocket; and
            a top pocket configured to contact a top inside surface of the box when the insulating insert is placed into the box, the top pocket adjacent to a side of one of the four side pockets;
        a flap adjacent to the top pocket; and
        four triangular tabs, each triangular tab comprising a corner that is proximate to a respective corner of the bottom pocket;
    wherein:
        each of the six pockets comprises a rectangular shape;
        each of the six pockets is filled with an insulating material;
        dimensions of each of the six pockets correspond to dimensions of one of the inside surfaces of the box;
        the insulating insert is formed from two sheets of paper that are each coated with a heat-seal coating; and
        each sealed divider is located between two adjacent pockets, the sealed dividers providing fold locations to permit the insulating insert to be folded and installed within the box so that each of the six pockets contacts a respective inside surface of the box.

2. The packaging system of claim 1, wherein the insulating material comprises cellulose insulation.

3. The packaging system of claim 1, wherein the insulating material comprises a recyclable material.

4. A packaging system for shipping one or more cold items, the packaging system comprising:
    a box comprising a moisture barrier coating on a plurality of inside surfaces of the box; and
    an insulating insert comprising six pockets and a plurality of sealed dividers, the six pockets comprising:
        a bottom pocket configured to contact a bottom inside surface of the box when the insulating insert is placed into the box;
        four side pockets each configured to contact a respective side inside surface of the box when the insulating insert is placed into the box, each of the four side pockets adjacent to a respective side of the bottom pocket; and
        a top pocket configured to contact a top inside surface of the box when the insulating insert is placed into the box, the top pocket adjacent to a side of one of the four side pockets;

wherein:
  each of the six pockets comprises a rectangular shape;
  each of the six pockets is filled with an insulating material;
  dimensions of each of the six pockets correspond to dimensions of one of the inside surfaces of the box;
  the insulating insert is formed from two sheets of paper that are each coated with a heat-seal coating;
  each sealed divider is located between two adjacent pockets, the sealed dividers providing fold locations to permit the insulating insert to be folded and installed within the box so that each of the six pockets contacts a respective inside surface of the box; and
  the insulating insert, before folding, comprises a shape having eight sides, the shape comprising four triangular tabs, the eight sides comprising:
    a first set of four sides that are each parallel with a respective side of one of the six pockets; and
    a second set of four sides that each form one side of one of the triangular tabs.

5. The packaging system of claim 4, wherein the heat-seal coating comprises a material that is water repellant and temperature insulating.

6. An insulating insert for a packaging system, the insulating insert comprising:
  six pockets comprising:
    a bottom pocket configured to contact a bottom inside surface of a box when the insulating insert is placed into the box;
    four side pockets each configured to contact a respective side inside surface of the box when the insulating insert is placed into the box, each of the four side pockets adjacent to a respective side of the bottom pocket; and
    a top pocket configured to contact a top inside surface of the box when the insulating insert is placed into the box, the top pocket adjacent to a side of one of the four side pockets;
  a flap adjacent to the top pocket;
  four triangular tabs, each triangular tab comprising a corner that is proximate to a respective corner of the bottom pocket; and
  a plurality of sealed dividers, each sealed divider being located between two adjacent pockets, the sealed dividers providing fold locations to permit the insulating insert to be folded and installed within the box so that each of the six pockets contacts a respective inside surface of the box;

wherein:
  the insulating insert is formed from two sheets of paper that are each coated with a heat-seal coating;
  each of the six pockets comprises a rectangular shape; and
  each of the six pockets is filled with an insulating material.

7. The insulating insert of claim 6, wherein:
  dimensions of each of the six pockets correspond to dimensions of one of the inside surfaces of the box.

8. The insulating insert of claim 6, wherein the insulating material comprises cellulose insulation.

9. The insulating insert of claim 6, wherein the insulating material comprises a recyclable material.

10. An insulating insert for a packaging system, the insulating insert comprising:
  six pockets comprising:
    a bottom pocket configured to contact a bottom inside surface of a box when the insulating insert is placed into the box;
    four side pockets each configured to contact a respective side inside surface of the box when the insulating insert is placed into the box, each of the four side pockets adjacent to a respective side of the bottom pocket; and
    a top pocket configured to contact a top inside surface of the box when the insulating insert is placed into the box, the top pocket adjacent to a side of one of the four side pockets; and
  a plurality of sealed dividers, each sealed divider being located between two adjacent pockets, the sealed dividers providing fold locations to permit the insulating insert to be folded and installed within the box so that each of the six pockets contacts a respective inside surface of the box;

wherein:
  the insulating insert is formed from two sheets of paper that are each coated with a heat-seal coating;
  each of the six pockets comprises a rectangular shape;
  each of the six pockets is filled with an insulating material;
  the insulating insert, before folding, comprises a shape having eight sides, the shape comprising four triangular tabs, the eight sides comprising:
    a first set of four sides that are each parallel with a respective side of one of the six pockets; and
    a second set of four sides that each form one side of one of the triangular tabs.

\* \* \* \* \*